(12) United States Patent
Qiu et al.

(10) Patent No.: US 12,552,870 B2
(45) Date of Patent: Feb. 17, 2026

(54) ANTI-HUMAN INTERLEUKIN 36 RECEPTOR MONOCLONAL ANTIBODY AND METHODS OF USE THEREOF TO TREAT DISEASE

(71) Applicant: QYUNS THERAPEUTICS CO., LTD., Jiangsu (CN)

(72) Inventors: Jiwan Qiu, Jiangsu (CN); Wang Li, Jiangsu (CN); Yi Zhou, Jiangsu (CN); Wei Chen, Jiangsu (CN); Yong Kong, Jiangsu (CN); Huaiyao Qiao, Jiangsu (CN); Yiliang Wu, Jiangsu (CN); Tao Chen, Jiangsu (CN)

(73) Assignee: QYUNS THERAPEUTICS CO., LTD., Jiangsu (CN)

( * ) Notice: Subject to any disclaimer, the term of this patent is extended or adjusted under 35 U.S.C. 154(b) by 0 days.

(21) Appl. No.: 19/085,184

(22) Filed: Mar. 20, 2025

(65) Prior Publication Data

US 2025/0215098 A1    Jul. 3, 2025

Related U.S. Application Data

(63) Continuation of application No. PCT/CN2022/134732, filed on Nov. 28, 2022.

(30) Foreign Application Priority Data

Oct. 20, 2022  (CN) .......................... 202211288779.2

(51) Int. Cl.
*C07K 16/28* (2006.01)

(52) U.S. Cl.
CPC ...... *C07K 16/2866* (2013.01); *C07K 2317/24* (2013.01); *C07K 2317/76* (2013.01); *C07K 2317/92* (2013.01)

(58) Field of Classification Search
CPC ............ C07K 16/2866; C07K 2317/24; C07K 2317/76; C07K 2317/92
See application file for complete search history.

(56) References Cited

U.S. PATENT DOCUMENTS

2018/0273627 A1    9/2018   Boecher et al.

FOREIGN PATENT DOCUMENTS

| CN | 104080808 | 10/2014 |
| CN | 107847590 | 3/2018 |
| CN | 112094349 | 12/2020 |
| CN | 112513091 | 3/2021 |
| CN | 114907477 | 8/2022 |
| CN | 117357474 | 1/2024 |
| EP | 4 242 230 | 9/2023 |
| WO | 2013/074569 | 5/2013 |
| WO | 2015/079821 | 6/2015 |
| WO | 2016/168542 | 10/2016 |
| WO | 2020/018503 | 1/2020 |
| WO | 2022/166977 | 8/2022 |

OTHER PUBLICATIONS

International Search Report issued Jul. 19, 2023 in International (PCT) Application No. PCT/CN2022/134732.
Larson, Eric T. et al., "X-ray crystal structure localizes the mechanism of inhibition of an IL-36R antagonist monoclonal antibody to interaction with Ig1 and Ig2 extra cellular domains", Protein Science, vol. 29, 2020, pp. 1679-1686.
Li, Mei et al., "IL-36 in inflammatory diseases", Chinese Journal of Immunology, vol. 34, No. 3, 2018, pp. 478-481, with English Abstract.

*Primary Examiner* — Robert S Landsman
(74) *Attorney, Agent, or Firm* — Wenderoth, Lind & Ponack, L.L.P.

(57) ABSTRACT

The present invention provides an anti-human interleukin 36 receptor (IL-36R) monoclonal antibody and a use thereof. The monoclonal antibody comprises three heavy chain complementarity determining regions CDR-H1, CDR-H2 and CDR-H3 and three light chain complementarity determining regions CDR-L1, CDR-L2 and CDR-L3, and the amino acid sequences of CDR-H1, CDR-H2, CDR-H3, CDR-L1, CDR-L2 and CDR-L3 are as shown in SEQ ID NO: 1 to SEQ ID NO: 6, respectively. Compared with Spesolimab, the monoclonal antibody has comparable binding affinity to human IL-36R, and the neutralizing activity of the monoclonal antibody at the cellular level is superior to that of Spesolimab.

12 Claims, 5 Drawing Sheets

Specification includes a Sequence Listing.

SEQUENCE LISTING

```
Sequence total quantity: 11
SEQ ID NO: 1            moltype = AA   length = 5
FEATURE                 Location/Qualifiers
source                  1..5
                        mol_type = protein
                        organism = synthetic construct
SEQUENCE: 1
NYAMG                                                                    5

SEQ ID NO: 2            moltype = AA   length = 16
```

| FEATURE | Location/Qualifiers |
|---|---|
| source | 1..16<br>mol_type = protein<br>organism = synthetic construct |

SEQUENCE: 2
YISGGGSAYY ASWAKG 16

| SEQ ID NO: 3 | moltype = AA  length = 12 |
|---|---|
| FEATURE | Location/Qualifiers |
| source | 1..12<br>mol_type = protein<br>organism = synthetic construct |

SEQUENCE: 3
WAIKSYFFGM DL 12

| SEQ ID NO: 4 | moltype = AA  length = 11 |
|---|---|
| FEATURE | Location/Qualifiers |
| source | 1..11<br>mol_type = protein<br>organism = synthetic construct |

SEQUENCE: 4
QASEYISSYL A 11

| SEQ ID NO: 5 | moltype = AA  length = 7 |
|---|---|
| FEATURE | Location/Qualifiers |
| source | 1..7<br>mol_type = protein<br>organism = synthetic construct |

SEQUENCE: 5
QASTLAS 7

| SEQ ID NO: 6 | moltype = AA  length = 12 |
|---|---|
| FEATURE | Location/Qualifiers |
| source | 1..12<br>mol_type = protein<br>organism = synthetic construct |

SEQUENCE: 6
QTNNAIHTYG GA 12

| SEQ ID NO: 7 | moltype = AA  length = 120 |
|---|---|
| FEATURE | Location/Qualifiers |
| source | 1..120<br>mol_type = protein<br>organism = synthetic construct |

SEQUENCE: 7
EVQLVESGGG LVQPGGSLRL SCAASGIDLS NYAMGWVRQA PGKGLEWVGY ISGGGSAYYA 60
SWAKGRFTIS RDNSKNTLYL QMNSLRAEDT AVYYCARWAI KSYFFGMDLW GQGTLVTVSS 120

| SEQ ID NO: 8 | moltype = AA  length = 110 |
|---|---|
| FEATURE | Location/Qualifiers |
| source | 1..110<br>mol_type = protein<br>organism = synthetic construct |

SEQUENCE: 8
DIQMTQSPSS VSASVGDRVT ITCQASEYIS SYLAWYQQKP GKAPKLLIYQ ASTLASGVPS 60
RFSGSGSGTD FTLTISSLQP EDFATYYCQT NNAIHTYGGA FGGGTKVEIK 110

| SEQ ID NO: 9 | moltype = AA  length = 335 |
|---|---|
| FEATURE | Location/Qualifiers |
| source | 1..335<br>mol_type = protein<br>organism = synthetic construct |

SEQUENCE: 9
MWSLLLCGLS IALPLSVTAD GCKDIFMKNE ILSASQPFAF NCTFPPITSG EVSVTWYKNS 60
SKIPVSKIIQ SRIHQDETWI LFLPMEWGDS GVYQCVIKGR DSCHRIHVNL TVFEKHWCDT 120
SIGGLPNLSD EYKQILHLGK DDSLTCHLHF PKSCVLGPIK WYKDCNEIKG ERFTVLETRL 180
LVSNVSAEDR GNYACQAILT HSGKQYEVLN GITVSITERA GYGGSVPKII YPKNHSIEVQ 240
LGTTLIVDCN VTDTKDNTNL RCWRVNNTLV DDYDESKRI REGVETHVSF REHNLYTVNI 300
TFLEVKMEDY GLPFMCHAGV STAYIILQLP APDFR 335

| SEQ ID NO: 10 | moltype = AA  length = 450 |
|---|---|
| FEATURE | Location/Qualifiers |
| source | 1..450<br>mol_type = protein<br>organism = synthetic construct |

SEQUENCE: 10
EVQLVESGGG LVQPGGSLRL SCAASGIDLS NYAMGWVRQA PGKGLEWVGY ISGGGSAYYA 60
SWAKGRFTIS RDNSKNTLYL QMNSLRAEDT AVYYCARWAI KSYFFGMDLW GQGTLVTVSS 120
ASTKGPSVFP LAPSSKSTSG GTAALGCLVK DYFPEPVTVS WNSGALTSGV HTFPAVLQSS 180

```
GLYSLSSVVT VPSSSLGTQT YICNVNHKPS NTKVDKRVEP KSCDKTHTCP PCPAPEAAGG    240
PSVFLFPPKP KDTLMISRTP EVTCVVVDVS HEDPEVKFNW YVDGVEVHNA KTKPREEQYN    300
STYRVVSVLT VLHQDWLNGK EYKCKVSNKA LPAPIEKTIS KAKGQPREPQ VYTLPPSREE    360
MTKNQVSLTC LVKGFYPSDI AVEWESNGQP ENNYKTTPPV LDSDGSFFLY SKLTVDKSRW    420
QQGNVFSCSV MHEALHNHYT QKSLSLSPGK                                    450

SEQ ID NO: 11          moltype = AA  length = 217
FEATURE                Location/Qualifiers
source                 1..217
                       mol_type = protein
                       organism = synthetic construct
SEQUENCE: 11
DIQMTQSPSS VSASVGDRVT ITCQASEYIS SYLAWYQQKP GKAPKLLIYQ ASTLASGVPS     60
RFSGSGSGTD FTLTISSLQP EDFATYYCQT NNAIHTYGGA FGGGTKVEIK RTVAAPSVFI    120
FPPSDEQLKS GTASVVCLLN NFYPREAKVQ WKVDNALQSG NSQESVTEQD SKDSTYSLSS    180
TLTLSKADYE KHKVYACEVT HQGLSSPVTK SFNRGEC                             217
```

ANTI-HUMAN INTERLEUKIN 36 RECEPTOR MONOCLONAL ANTIBODY AND METHODS OF USE THEREOF TO TREAT DISEASE

RELATED APPLICATIONS

The present application is a bypass continuation application of International PCT Application No. PCT/CN2022/134732, filed Nov. 28, 2022, and claims priority to Chinese Application No. 202211288779.2, filed Oct. 20, 2022, the disclosures of which are herein incorporated by reference in their entirety.

REFERENCE TO AN ELECTRONIC SEQUENCE LISTING

The contents of the electronic sequence listing (AttachH-SEQ-0302A.xml; Size: 11,591 bytes; and Date of Creation: Mar. 18, 2025) is herein incorporated by reference in its entirety.

TECHNICAL FIELD

The present application relates to the field of antibody drugs. Specifically, the present application relates to a monoclonal antibody against human interleukin-36 receptor (IL-36R) and use thereof.

BACKGROUND ART

Interleukin-36 (IL-36) belongs to the IL-1 family (IL1F) and is composed of IL-36 receptor agonists IL-36α (IL1F6), IL-36β (IL18F8), and IL-36γ (IL1F9), and IL-36 receptor antagonist IL-36Ra (IL1F5). Its structural pattern is similar to that of the classical IL-1 family: it lacks signal peptides and cannot be secreted through the classical Golgi-endoplasmic reticulum pathway; usually inactive precursors are formed firstly, and then are hydrolyzed and activated by proteases. IL-36 can be produced by various cells such as monocytes, macrophages, T/B lymphocytes, keratinocytes, epithelial cells, etc. The receptor of IL-36 consists of the specific receptor IL-36R (also known as IL-1RL2, Interleukin-1 receptor like 2) and the IL-1 receptor accessory protein IL-1RAcP (IL-1 receptor accessory protein), both of which are composed of three domains: the extracellular domain, the transmembrane domain, and the intracellular Toll/IL-1 receptor (TIR) domain. Mature agonistic IL-36 ligands (α, β, γ) by proteolysis bind to IL-36R to form a binary complex, which then recruits IL-1RAcP to assemble into a functional ternary complex. The intracellular TIRs of IL-36R and IL-1RAcP interact, aggregate and transduce the adaptor proteins Myeloid differentiation factor 88 (MyD88) and IL-1 receptor associated kinase (IRAK), thereby activating downstream NF-κB (Nuclear factor kappa-B) and MAPK (Mitogen-activated protein kinase) signaling pathways. When IL-36 is expressed normally, it acts as the host defense through inflammatory reactions. When the expression of IL-36 is dysregulated, its receptor expressing cells (epithelial cells, fibroblasts, keratinocytes, monocytes, macrophages, dendritic cells, T cells) is stimulated to produce inflammatory cytokines, chemokines, adhesion molecules, etc., thereby mediating pathological inflammatory reactions and participating in the pathological processes of chronic inflammation and autoimmune diseases such as generalized pustular psoriasis, palmoplantar pustulosis, atopic dermatitis, inflammatory bowel disease, chronic obstructive pulmonary disease, etc.

[1] Towne J E, Garka K E, Renshaw B R, et al. Interleukin (IL)-1F6, IL-1F8, and IL-1F9 signal through IL-1Rrp2 and IL-1RAcP to activate the pathway leading to NF-kappaB and MAPKs [J]. Journal of Biological Chemistry, 2004, 279(14):13677-13688.

[2] Gabay C, Towne J E. Regulation and function of interleukin-36 cytokines in homeostasis and pathological conditions [J]. Journal of Leukocyte Biology, 2015, 97(4):645.

[3] Henry C M, Sullivan G P, Clancy D M, et al. Neutrophil-Derived Proteases Escalate Inflammation through Activation of IL-36 Family Cytokines[J]. Cell Reports, 2016, 14(4):708-722.

[4] Towne J E, Renshaw B R, Douangpanya J, et al. Interleukin-36 (IL-36) Ligands Require Processing for Full Agonist (IL-36α, IL-36β, and IL-36γ) or Antagonist (IL-36Ra) Activity [J]. Journal of Biological Chemistry, 2011, 286(49):42594-602.

[5] Buhl, A L, Wenzel, J. Interleukin-36 in Infectious and Inflammatory Skin Diseases [J]. Frontiers in Immunology, 2019.01162

SUMMARY

The aim of this application is to provide a new anti-human IL-36R monoclonal antibody, a pharmaceutical composition comprising the monoclonal antibody, and the use of the monoclonal antibody in the preparation of a medicament.

The technical solutions of this application are as follows:

1. An anti-human IL-36R monoclonal antibody, comprising three heavy chain complementarity determining regions (CDR-H1, CDR-H2 and CDR-H3), and three light chain complementarity determining regions (CDR-L1, CDR-L2 and CDR-L3), wherein the amino acid sequence of the CDR-H1 (CDR-H1 represents heavy chain CDR1 in this specification) is represented by SEQ ID NO: 1 (NYAMG);

the amino acid sequence of the CDR-H2 (CDR-H2 represents heavy chain CDR2 in this specification) is represented by SEQ ID NO: 2 (YISGGGSAYYASWAKG);

the amino acid sequence of the CDR-H3 (CDR-H3 represents heavy chain CDR3 in this specification) is represented by SEQ ID NO: 3 (WAIKSYFGMDL);

the amino acid sequence of the CDR-L1 (CDR-L1 represents light chain CDR1 in this specification) is represented by SEQ ID NO: 4 (QASEYISSYLA);

the amino acid sequence of the CDR-L2 (CDR-L2 represents light chain CDR2 in this specification) is represented by SEQ ID NO: 5 (QASTLAS); and the amino acid sequence of the CDR-L3 (CDR-L3 represents light chain CDR3 in this specification) is represented by SEQ ID NO: 6 (QTNNAIHTYGGA).

2. The monoclonal antibody according to item 1, wherein it comprises a heavy chain variable region and a light chain variable region, and wherein the amino acid sequence of the heavy chain variable region is represented by SEQ ID NO: 7, which is

EVQLVESGGGLVQPGGSLRLSCAASGIDLSNYAMGWVRQAPGKGLEWVG

YISGGGSAYYASWAKGRFTISRDNSKNTLYLQMNSLRAEDTAVYYCARW

AIKSYFFGMDLWGQGTLVTVSS;

and
the amino acid sequence of the light chain variable region is represented by SEQ ID NO: 8, which is

DIQMTQSPSSVSASVGDRVTITCQASEYISSYLAWYQQKPGKAPKLLIY

QASTLASGVPSRFSGSGSGTDFTLTISSLQPEDFATYYCQTNNAIHTYG

GAFGGGTKVEIK.

3. An isolated nucleic acid encoding the monoclonal antibody of any one of the preceding items.

4. A host cell comprising the nucleic acid according to item 3.

The nucleic acid can exist on a vector. The vector can belong to any type, for example, a recombinant vector such as an expression vector. Any one of a variety of host cells can be used. In an embodiment, the host cell is a prokaryotic cell, such as *E. coli*. In another embodiment, the host cell is a eukaryotic cell, such as a mammalian cell, such as Chinese hamster ovary (CHO) cell.

5. A method for producing a monoclonal antibody, comprising culturing the host cell according to item 4 to produce the monoclonal antibody of any one of the preceding items.

The method comprises expressing a recombinant vector encoding the anti-human IL-36R monoclonal antibody in suitable host cell to produce the monoclonal antibody. In some embodiments, the method comprises culturing the host cell comprising a nucleic acid encoding the anti-human IL-36R monoclonal antibody, thereby expressing the nucleic acid. The method may further comprise recovering the anti-human IL-36R monoclonal antibody from host cell culture or host cell medium.

6. A pharmaceutical composition, comprising the monoclonal antibody of any one of the preceding items and a pharmaceutically acceptable carrier.

The pharmaceutical composition may further comprise an additional therapeutic agent (such as a different anti-human IL-36R antibody).

7. The pharmaceutical composition according to item 6, which is used for treating a signaling related disease mediated by IL-36R.

8. The pharmaceutical composition according to item 7, wherein the signaling related disease mediated by IL-36R is selected from the group consisting of dermatitis, psoriasis, inflammatory bowel disease, arthritis, systemic lupus erythematosus, inflammatory lung disease, and chronic kidney disease,
preferably, the signaling related disease mediated by IL-36R is selected from the group consisting of generalized pustular psoriasis, palmoplantar pustulosis, atopic dermatitis, inflammatory bowel disease, chronic obstructive pulmonary disease, psoriasis vulgaris, psoriatic arthritis, multiple sclerosis, rheumatoid arthritis, scleroderma, asthma, or ankylosing spondylitis.

9. Use of the monoclonal antibody of any one of preceding items in the preparation of a medicament for treating a signaling related disease mediated by IL-36R.

10. The use according to item 9, wherein the signaling related disease mediated by IL-36R is selected from the group consisting of dermatitis, psoriasis, inflammatory bowel disease, arthritis, systemic lupus erythematosus, inflammatory lung disease, and chronic kidney disease,
preferably, the signaling related disease mediated by IL-36R is selected from the group consisting of generalized pustular psoriasis, palmoplantar pustulosis, atopic dermatitis, inflammatory bowel disease, chronic obstructive pulmonary disease, psoriasis vulgaris, psoriatic arthritis, multiple sclerosis, rheumatoid arthritis, scleroderma, asthma, or ankylosing spondylitis.

11. A method for treating a signaling related disease mediated by IL-36R, comprising:
administering the monoclonal antibody according to any one of the preceding items or the pharmaceutical composition according to any one of the preceding items to a subject in need thereof.

12. The method according to item 11, wherein the signaling related disease mediated by IL-36R is selected from the group consisting of dermatitis, psoriasis, inflammatory bowel disease, arthritis, systemic lupus erythematosus, inflammatory lung disease, and chronic kidney disease,
preferably, the signaling related disease mediated by IL-36R is selected from the group consisting of generalized pustular psoriasis, palmoplantar pustulosis, atopic dermatitis, inflammatory bowel disease, chronic obstructive pulmonary disease, psoriasis vulgaris, psoriatic arthritis, multiple sclerosis, rheumatoid arthritis, scleroderma, asthma, or ankylosing spondylitis.

This application provides a novel anti-human IL-36R monoclonal antibody, which has comparable affinity for binding to IL-36R and superior neutralizing activity at the cellular level compared to Spesolimab, an anti-human IL-36R monoclonal antibody in the prior art. It should be noted that Spesolimab is a monoclonal antibody drug targeting IL-36R developed by Boehringer Ingelheim. Spesolimab has successfully completed in Phase III clinical NAVIGATOR of treatment of adult generalized pustular psoriasis and has obtained marketing approval from the US Food and Drug Administration, as well as priority review qualification from the China National Medical Products Administration. The monoclonal antibody of this application (such as QX009N (HZD25-54)) can be an IgG1 (immunoglobulin G1) type of humanized monoclonal antibody targeting IL-36R (interleukin-36 receptor), which has a high affinity for IL-36R, and can specifically bind to IL-36R, and block IL-36 inflammatory pathway signaling. HZD25-54 binds to IL-36R, competitively blocking the binding of receptor agonists (IL-36 α, β, γ) to IL-36R, downregulating downstream pro-inflammatory signaling pathway and pro-fibrotic signaling pathway, inhibiting inflammatory responses mediated by epithelial cells/fibroblasts/immune cells, thereby reducing the release of pathogenic inflammatory cytokines in inflammatory diseases/skin diseases, and achieving the goal of disease control.

The monoclonal antibody of this application exhibits superior neutralizing activity at the cellular level compared to Spesolimab (expressed and prepared based on the sequence disclosed by the patent), and is expected to demonstrate good clinical efficacy in the prevention and treatment of related diseases.

BRIEF DESCRIPTION OF THE DRAWINGS

The drawings are intended for a better understanding of the present application and do not constitute undue limitations on the present application. Among them.

DETAILED DESCRIPTION

Figure 1:
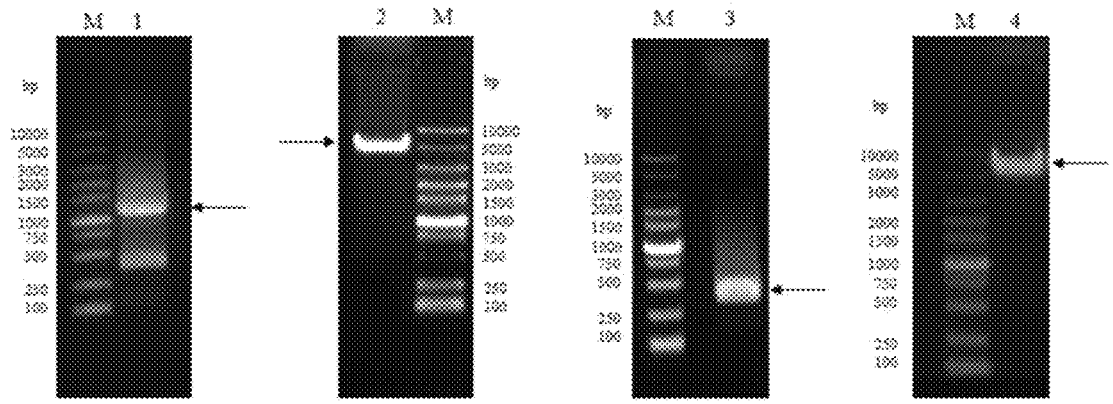
FIG. 1 shows the results of nucleic acid electrophoresis of the HZD25-54 transient transfection expression plasmid constructed, wherein M: Marker; Band 1: PCR product 25VH-Hu12; Band 2: pQX1, HindIII/BamHI; Band 3: PCR product 25VK-Hu17; Band 4: pQX2.3, HindIII/BsiWI.

The following provides an explanation of the exemplary examples of the present application, including various details to aid understanding. They should be considered merely exemplary. Therefore, those skilled in the art should recognize that various changes and modifications can be made to the examples described herein without departing from the scope and spirit of the present application. Similarly, for clarity and conciseness, descriptions of well-known functions and structures have been omitted in the following description.

The technical terms mentioned in this specification have the same meanings as those commonly understood by those skilled in the art. In case of conflict, the definitions in this specification shall prevail.

Generally speaking, the terms used in this specification have the following meanings.

In this specification, "isolated" antibodies refer to antibodies that have been separated from their natural environmental components. In some embodiments, the antibody is purified to a purity greater than 95% or 99%, in which the purity is determined by methods such as electrophoresis (e.g., SDS-PAGE, isoelectric focusing (IEF), capillary electrophoresis) or chromatography (e.g., ion exchange or reverse phase HPLC). For a review of methods for evaluating antibody purity, please refer to Flatman et al, J. Chromatogr. B848: 79-87 (2007).

In this specification, "monoclonal antibody" refers to an antibody derived from a population of essentially homologous antibodies, that is, various antibodies constituting the population are identical and/or bind to the same epitope, except for possible variant antibodies (such as those containing naturally occurring mutations or produced during the production process of monoclonal antibody products), which typically exist in trace amounts. Unlike polyclonal antibody products that typically include different antibodies targeting different determinants (epitopes), each monoclonal antibody in monoclonal antibody products targets a single determinant on the antigen. Therefore, the modifier 'monoclonal' indicates that the antibody is derived from a substantially homologous antibody population and should not be interpreted as requiring the production of the antibody by any specific method. For example, the monoclonal antibody to be used in this application can be prepared using various techniques, including but not limited to hybridoma methods, recombinant DNA methods, phage display methods, and methods using genetically modified animals containing all or part of the human immunoglobulin gene locus. This application describes such methods and other exemplary methods for preparing monoclonal antibodies.

In this specification, "affinity" refers to the strength of the sum of non-covalent interactions between a single binding site of a molecule (e.g. antibody) and its binding partner (e.g. antigen). Unless otherwise specified, the term 'binding affinity' used in this specification refers to the inherent binding affinity reflecting the 1:1 interaction between members of a binding pair (e.g. antibody and antigen). The affinity of molecule X for its partner Y can usually be represented by the equilibrium dissociation constant (KD). Affinity can be measured by common methods known in this field.

In this specification, human interleukin-36 receptor (hIL-36R, sometimes abbreviated as IL-36R) refers to a membrane receptor derived from humans, and its extracellular amino acid sequence is represented by SEQ ID NO: 9, wherein the underlined portion represents the signal peptide.

SEQ ID NO: 9:
MWSLLLCGLSIALPLSVTADGCKDIFMKNEILSASQPFAFNCTFPPITS

GEVSVTWYKNSSKIPVSKIIQSRIHQDETWILFLPMEWGDSGVYQCVIK

GRDSCHRIHVNLTVFEKHWCDTSIGGLPNLSDEYKQILHLGKDDSLTCH

LHFPKSCVLGPIKWYKDCNEIKGERFTVLETRLLVSNVSAEDRGNYACQ

AILTHSGKQYEVLNGITVSITERAGYGGSVPKIIYPKNHSIEVQLGTTL

IVDCNVTDTKDNTNLRCWRVNNTLVDDYYDESKRIREGVETHVSFREHN

LYTVNITFLEVKMEDYGLPFMCHAGVSTAYIILQLPAPDFR

In this specification, "anti-human IL-36R monoclonal antibody" refers to a monoclonal antibody that can bind to human IL-36R with sufficient affinity, making it suitable for use as a diagnostic and/or therapeutic agent targeting human IL-36R.

The anti-human IL-36R monoclonal antibody in this application does not bind to proteins unrelated to the target. Herein, "proteins unrelated to the target" refer to proteins other than human IL-36R as the target. Herein, "not bind" refers to that when the binding ability of the anti-human IL-36R monoclonal antibody of the present application to the human IL-36R as the target is taken as 100%, the binding ability of the anti-human IL-36R monoclonal antibody of the present application to the unrelated protein is less than 10%, such as 9%, 8%, 7%, 6%, 5%, 4%, 3%, 2%, 1% or 0.

The anti-human IL-36R monoclonal antibody in this application may not bind to IL-36R of other animal species. Herein, "other animal species" refers to animal species other than humans, such as marmosets, machins, pigs, dogs, rabbits, rats, mice, guinea pigs, etc. Herein, "not bind" refers to that when the binding ability of the anti-human IL-36R monoclonal antibody of the present application to the human IL-36R as the target is taken as 100%, the binding ability of the anti-human IL-36R monoclonal antibody of the present application to IL-36R of other animal species is less than 10%, such as 9%, 8%, 7%, 6%, 5%, 4%, 3%, 2%, 1% or 0.

The human IL-36R monoclonal antibody of this application can have an equilibrium dissociation constant (KD) of, for example, ≤1 μM, ≤100 nM, ≤50 nM, or ≤40 nM.

The experimental results show that the anti-human IL-36R monoclonal antibody of this application can specifically bind to human IL-36R.

The anti-human IL-36R monoclonal antibody of this application is comparable to or superior to similar monoclonal antibody products on the market in many biological activities. The biological activities are, for example, the activity of neutralizing STAT3 phosphorylation in cells induced by the human IL-36 (α, β, γ), the activity of neutralizing CXCL-1 and IL-8 release from cells induced by the human IL-36 (α, β, γ), the activity of neutralizing IL-8 release from human PBMC cells induced by the human IL-36β, etc.

In a specific embodiment, the amino acid sequence of the heavy chain of the anti-human IL-36R monoclonal antibody of the present application can be represented by SEQ ID NO: 10; the amino acid sequence of the light chain of the anti-human IL-36R monoclonal antibody of the present application can be represented by SEQ ID NO: 11.

SEQ ID NO: 10
EVQLVESGGGLVQPGGSLRLSCAASGIDLSNYAMGWVRQAPGKGLEWVG

YISGGGSAYYASWAKGRFTISRDNSKNTLYLQMNSLRAEDTAVYYCARW

AIKSYFFGMDLWGQGTLVTVSSASTKGPSVFPLAPSSKSTSGGTAALGC

LVKDYFPEPVTVSWNSGALTSGVHTFPAVLQSSGLYSLSSVVTVPSSSL

GTQTYICNVNHKPSNTKVDKRVEPKSCDKTHTCPPCPAPEAAGGPSVFL

FPPKPKDTLMISRTPEVTCVVVDVSHEDPEVKFNWYVDGVEVHNAKTKP

REEQYNSTYRVVSVLTVLHQDWLNGKEYKCKVSNKALPAPIEKTISKAK

GQPREPQVYTLPPSREEMTKNQVSLTCLVKGFYPSDIAVEWESNGQPEN

NYKTTPPVLDSDGSFFLYSKLTVDKSRWQQGNVFSCSVMHEALHNHYTQ

KSLSLSPGK

SEQ ID NO: 11
DIQMTQSPSSVSASVGDRVTITCQASEYISSYLAWYQQKPGKAPKLLIY

QASTLASGVPSRFSGSGSGTDFTLTISSLQPEDFATYYCQTNNAIHTYG

GAFGGGTKVEIKRTVAAPSVFIFPPSDEQLKSGTASVVCLLNNFYPREA

KVQWKVDNALQSGNSQESVTEQDSKDSTYSLSSTLTLSKADYEKHKVYA

CEVTHQGLSSPVTKSFNRGEC

Both SEQ ID NO: 10 and SEQ ID NO: 11 are humanized sequences. In order to remove the ADCC and CDC effects of antibodies, LALA mutations are performed in the heavy chain constant region.

In this specification, "isolated" nucleic acid refers to a nucleic acid molecule that has been separated from its natural environmental components. Isolated nucleic acids include nucleic acid molecules typically present in cells comprising nucleic acid molecules, but the nucleic acid molecules exist outside the chromosome or at a chromosomal position different from their natural chromosomal position.

In this specification, 'isolated nucleic acid encoding anti-IL-36R monoclonal antibody' refers to one or more nucleic acid molecules encoding the heavy and light chains of the antibody, including such nucleic acid molecules in a single vector or separate vectors, as well as such nucleic acid molecules present at one or more positions in the host cell.

In this specification, "vector" refers to a nucleic acid molecule that can amplify another nucleic acid connected to it. This term includes vectors that serve as self-replicating nucleic acid structures and vectors integrated into the genome of host cells into which they have been introduced. Some vectors can guide the expression of nucleic acids that are operationally linked to them. This type of vector is referred to as an "expression vector" in this application.

In this specification, "host cell", "host cell line", and "host cell culture" are interchangeable and refer to cells in which exogenous nucleic acid has been introduced, including the offspring of such cells. Host cells include "transformants" and "transformed cells", which include primary transformed cells and offspring derived from them (without considering the number of generations). Offspring may not be completely identical to parental cells in terms of nucleic acid content, and may contain mutations. The mutant offspring with the same function or biological activity selected or screened from the initial transformed cells are included in this specification.

In this specification, "pharmaceutical composition" refers to a product that presents in such a form that the biological activity of the active ingredient contained therein can exert the effect, and the composition does not contain any additional components that have unacceptable toxicity to the subject to whom the formulation is to be administered.

In this specification, "pharmaceutically acceptable carrier" refers to an ingredient in a pharmaceutical composition other than the active ingredient, which is non-toxic to the subject. Pharmaceutically acceptable carriers include, but are not limited to, buffering agents, excipients, stabilizers, or preservatives.

In this application, "monoclonal antibody" is generally a human antibody, which can be prepared using techniques known to those skilled in the art. For example, human antibodies are generally described in van Dijk, M. A. and van de Winkel, J. G., Curr. Opin. Pharmacol. 5: 368-374 (2001) and Lonberg, N., Curr. Opin. Immunol. 20:450-459 (2008).

Antibodies can be prepared by administering immunogens to genetically modified animals that have been modified so that antigen attack stimulates the production of intact human antibodies or intact antibodies with human variable regions. These animals typically contain some or all of the human immunoglobulin loci, which replace endogenous immunoglobulin loci, or exist outside the chromosome or randomly integrated into the animal's body. In such transgenic mice, the endogenous immunoglobulin loci are generally inactivated. For a review of methods for obtaining human antibodies from transgenic animals, please refer to Lonberg, N. Nat. Biotech. 23:1117-1125 (2005). You can also refer to, for example, XENOMOUSE™ technology described in U.S. Pat. Nos. 6,075,181 and 6,150,584, HUMAB® technology described in U.S. Pat. No. 5,770,429, K-MMOUSE™ technology described in U.S. Pat. No. 7,041,870, and VELOCIMOUSE® technology described in US Patent Application Publication No. U.S. 2007/0061900. The human variable region of the complete antibody generated by such animals can be further modified, for example, by combining with different human constant regions.

Human antibodies can also be prepared using hybridoma based methods. Human myeloma and mouse-human hybrid myeloma cells for producing human monoclonal antibodies have been described (see, for example, Kozbor, D., J. Immunol. 133:3001-3005 (1984); Brodeur, B. R. et al, Monoclonal Antibody Production Techniques and Applications, Marcel Dekker, Inc., New York (1987), pp. 51-63; Boerner, P., et al, J. Immunol. 147:86-95 (1991). The human antibodies produced by human B cell hybridoma technology are also recorded in Li, J. et al, Proc. Natl. Acad. Sci. USA103: 3557-3562 (2006). Other methods include those recorded in, for example, U.S. Pat. No. 7,189,826 (which describes the generation of monoclonal human IgM antibodies from hybridoma cell lines) and Ni, Xiandai Mianyixue, 26(4); 265-268 (which describes human-human hybridoma). The human hybridoma technique (Trioma technique) is also recorded in Vollmers, H. P. and Brandlein, S., Histology and Histopathology 20: 927-937(2005); Vollmers, H. P. and Brandlein, S., Methods and Findings in Experimental and Clinical Pharmacology 27:185-191(2005).

Human antibodies can also be generated by isolating variable domain sequences of Fv clones selected from phage display libraries derived from humans, and then combining such variable domain sequences with the desired human constant domain.

It is also possible to select human antibodies based on autoantibody libraries, that is, it is also possible to isolate human antibodies by screening the combinatorial library for one or more antibodies with the desired activity. For example, various methods for producing phage display libraries and screening such libraries for antibodies with desired binding characteristics are known in this field. This method is summarized in, for example, Hoogenboom, H. R. et al, Methods in Molecular Biology 178: 1-37 (2001) and further recorded in, for example, McCafferty, J. et al, Nature 348:552-554(1990); Clackson, T. et al, Nature 352:624-628 (1991); Marks, J. D. et al, J. Mol. Biol. 222:581-597(1992); Marks, J. D. and Bradbury, A., Methods in Molecular Biology 248:161-175(2003); Sidhu, S. S., et al, J. Mol. Biol. 338:299-310(2004); Lee, C. V., et al, J. Mol. Biol. 340:1073-1093(2004); Fellouse, F. A., Proc. Natl. Acad. Sci. USA 101: 12467-12472(2004); and Lee, C. V. et al, J. Immunol. Methods 284:119-132(2004).

In some phage display methods, the complete sets of VH and VL genes are cloned by polymerase chain reaction (PCR) and randomly recombined in a phage library. Antigen binding phages are then screened in the phage library, as described in Winter, G. et al, Ann. Rev. Immunol. 12: 433-455 (1994). Bacteriophages typically display antibody fragments in the form of single chain Fv (scFv) fragments or Fab fragments. Libraries derived from immunological sources provide high-affinity antibodies against immunogens without the need to construct hybridomas. Alternatively, it is possible to clone the non-immune complete set (for example, from humans) to provide a single source of antibodies against a large number of nonself-antigens and self-antigens in the absence of any immunity, as described in Griffiths, A. D. et al, EMBO J, 12: 725-734(1993). Finally, unrearranged V gene segments can also be cloned from stem cells, and highly variable CDR3 regions can be encoded using PCR primers containing random sequences and rearranged in vitro to generate non-immune libraries, as described in Hoogenboom, H. R. and Winter, G., J. Mol. Biol. 227: 381-388 (1992). Patent publications describing human antibody phage libraries include, for example, U.S. Pat. No. 5,750,373 and U.S. Patent Publication No. 2005/0079574, 2005/0119455, 2005/0266000, 2007/0117126, 2007/0160598, 2007/0237764, 2007/0292936, and 2009/0002360.

The antibody can also be a multispecific antibody, such as a bispecific antibody. Bispecific antibodies are monoclonal antibodies that have binding specificity for at least two different sites. The techniques used to generate multispecific antibodies include but are not limited to recombinant coexpression of two pairs of immunoglobulin heavy and light chains with different specificities (see Milstein, C. and Cuello, A. C., Nature 305:537-540 (1983); WO 93/08829; and Traunecker, A. et al, EMBO J. 10: 3655-3659 (1991)) and "joint-into-hole" engineering (see, for example, U.S. Pat. No. 5,731,168). The multispecific antibodies also can be generated by engineered electrostatic manipulation effect for generating antibody Fc-heterodimer molecules (WO 2009/089004); crosslinking two or more antibodies or fragments thereof (see, for example, U.S. Pat. No. 4,676,980 and Brennan, M. et al., Science 229: 81-83(1985)); using leucine zipper to generate bispecific antibodies (see, for example, Kostelny, S. A. et al, J. Immunol. 148: 1547-1553(1992)); using the "bi-antibody" technique for generating bispecific antibody fragments (see, for example, Holliger, P., et al, Proc. Natl. Acad. Sci. USA 90: 6444-6448(1993)); using single chain Fv (scFv) dimers (see e.g. Gruber, M. et al, J. Immunol. 152: 5368-5374(1994)); and preparing tri-specific antibodies (for example, as described in Tutt, A., et al., J. Immunol. 147: 60-69 (1991)).

The monoclonal antibodies in this application also include engineered antibodies with three or more functional antigen binding sites, including "octopus antibodies" (see, for example, U.S. 2006/0025576).

The antibodies in this application may also include multispecific antibody described in WO 2009/080251, WO 2009/080252, WO2009/080253, WO 2009/080254, WO 2010/112193, WO 2010/115589, WO2010/136172, WO 2010/145792, WO 2010/145793, WO 2011/117330, WO 2012/025525, WO 2012/025530, WO 2013/026835, WO2013/026831, WO 2013/164325 or WO 2013/174873.

The monoclonal antibodies in this application can also be antibody variants, for example, it may be desirable to improve the binding affinity and/or other biological characteristics of the antibody. Amino acid sequence variants of the antibody can be prepared by introducing appropriate modifications into the nucleotide sequence encoding the antibody, or by peptide synthesis. Such modification includes, for example, deletion, insertion, and/or substitution of residues within the amino acid sequence of the antibody. Any combination of deletion, insertion, and substitution can be performed to obtain the final construct, as long as the final construct has the desired features, such as antigen binding. Therefore, in some embodiments, antibody variants with one or more amino acid replacements are provided, and sites of interest for replacement mutations include HVR and FR, for example, amino acid replacements can be introduced into the antibody of interest and products with desired activity (such as retained/improved antigen binding, reduced immunogenicity, or improved ADCC or CDC) can be selected.

EXAMPLES

The experimental methods used in the following examples are conventional methods unless otherwise specified.

The materials, reagents, etc. used in the following examples can be obtained from commercial sources unless otherwise specified.

Example 1: Preparation of Anti-Human IL-36R Monoclonal Antibody QX009N

The human interleukin-36 receptor (hIL-36R-Rabbit Fc) produced by Qyuns Therapeutics Co., Ltd was used as an immunogen to immunize New Zealand rabbits. Antibody clones with antigen binding specificity were obtained using B cell cloning technology, and monoclonal antibodies that bound to human IL-36R and had human IL-36R inhibitory activity were selected. The cell supernatant was detected by Binding ELISA and the release of IL-8 from HT29 cells for analysis and screening, and the target clone was selected. The above immunization and screening processes were entrusted to commercial companies for completion.

Ten clones were selected for recombinant expression and sequenced. After testing, it was found that the cell with clone 25 had the best neutralizing activity. Therefore, clone 25 was humanized. The homology alignment of human IgG germline sequence was performed using NCBI IgBlast. IGHV3-66*01 was selected as the template for heavy chain CDR transplantation, and the CDR regions of the heavy chain of the clone 25 (i.e., CDR-H1 (SEQ ID NO: 1), CDR-H2 (SEQ ID NO: 2), and CDR-H3 (SEQ ID NO: 3)) were transplanted into the backbone region of IGHV3-66*01. IGKV1-12*01 was selected as the template for light chain CDR transplantation, and the CDR regions of the light chain of the clone 25 (i.e., CDR-L1 (SEQ ID NO: 4), CDR-L2 (SEQ ID NO: 5), and CDR-L3 (SEQ ID NO: 6)) were transplanted into the backbone region of IGKV1-12*01. The back mutation was performed on specific sites in the backbone region and site directed mutagenesis was performed in CDR region to obtain the variable region of monoclonal antibody QX009N in this application. Finally, the sequence of the humanized heavy chain variable region is represented by SEQ ID NO: 7; and the amino acid sequence of the humanized light chain variable region is represented by SEQ ID NO: 8.

The genes of the heavy chain (SEQ ID NO: 10) and the light chain variable region (SEQ ID NO: 8) were obtained by PCR amplification. The heavy chain expression plasmid pQX1 was double-digested with HindIII and BamHI; the light chain expression plasmid pQX2.3 was double-digested with HindIII and BsiWI; and PCR amplified genes were inserted into corresponding expression plasmids using Infusion recombinase to construct heavy chain expression plasmid pQX2.1-25VH-Hu12 and light chain expression plasmid pQX2.3-25VK-Hu17.

The results of nucleic acid electrophoresis of PCR amplified heavy chain gene fragments, light chain variable region gene fragments, and double-digested plasmids are shown in FIG. 1. From FIG. 1, the PCR amplification results of the antibody heavy chain and light chain variable regions, as well as the results of the double-digested heavy chain and light chain expression plasmids can be seen, in which the plasmid size of the heavy chain and light chain is about 5000 bp, with the heavy chain being about 1469 bp, and the light chain variable region being about 441 bp.

Figure 2:
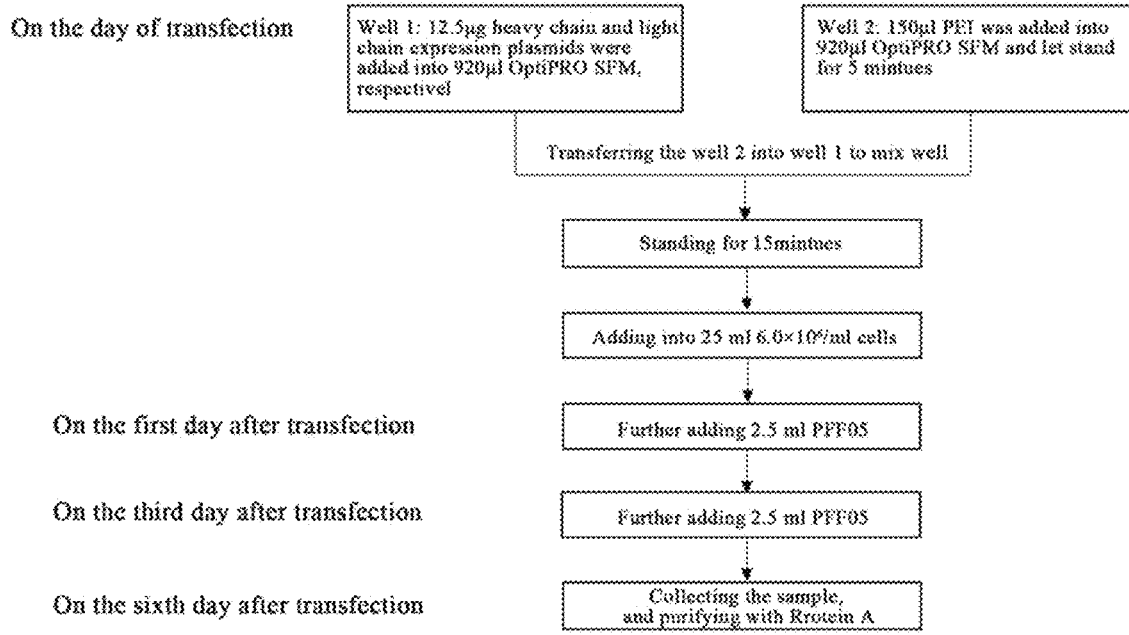
FIG. 2 is a flowchart of transient transfection expression.

ExpiCHO-S cells were co-transfected with the correctly sequenced heavy chain expression plasmid pQX2.1-25VH-Hu12 (the amino acid sequence of the expressed heavy chain is represented by SEQ ID NO: 10) and light chain expression plasmid pQX2.3-25VK-Hu17 (the amino acid sequence of the expressed light chain is represented by SEQ ID NO: 11). On the day before transfection, ExpiCHO-S cells were diluted to $3 \times 10^6$ cells/ml for passage. On the day of transfection, the cells were diluted to $6 \times 10^6$ cells/ml, and 25 ml of cells were placed into a 125 ml of shake flask, ready for transfection. The transfection and expression processes are shown in FIG. 2.

Figure 3:
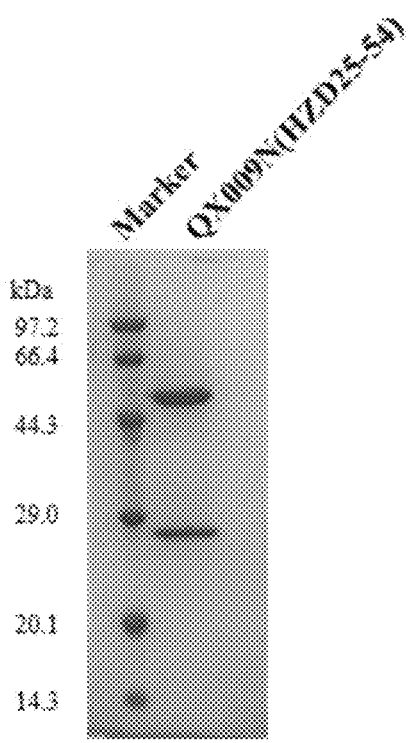
FIG. 3 shows the electrophoretogram of QX009N (HZD25-54).

On the 6th day after transfection, the culture supernatant was harvested and purified in one step using ProteinA. The purified antibody was detected by SDS-PAGE electrophoresis and named QX009N (HZD25-54). The detection results of this antibody by protein electrophoresis are shown in FIG. 3. Protein electrophoresis was performed using denaturing reducing gel, and the results in FIG. 3 show two bands with sizes of approximately 50 kDa and 25 kDa, respectively, which are consistent with the theoretical molecular weights of the heavy chain (49.0 kDa) and light chain (23.4 kDa).

Example 2: Determination of Equilibrium Dissociation Constant ($K_D$)

The affinity of QX009N (HZD25-54) with human IL-36R was detected using Biacore T200, and all processes were performed at 25° C. An appropriate amount of antibody was fixed by capture method using a commercial Protein A chip, so that the Rmax was about 50 RU, and the capture flow rate was 10 μl/min. The antigen was gradiently diluted, and the flow rate in the instrument was switched to 30 μl/min. The antigen flowed through the reference channel and the channel of the fixed antibody in order of concentration from low to high, with flowing through the buffer as a negative control. After each binding and dissociation was completed, the chip was regenerated with glycine of pH 1.5. The 1:1 binding model in the Kinetics option of the built-in analysis software of the instrument was selected for fitting, and the binding rate constant $k_a$, dissociation rate constant $k_d$, and dissociation equilibrium constant $K_D$ of the antibody were calculated.

In addition, the affinity of QX009N (HZD25-54) was compared with that of Spesolimab, a monoclonal antibody against human IL-36R currently in clinical phase III. The detection method for known antibody was the same as that for QX009N, and the results are shown in Table 1. Spesolimab was obtained by constructing an expression plasmid based on the B6 sequence provided by U.S. Pat. No. 9,023,995B2 and transiently transfecting it into ExpiCHO-S cells.

TABLE 1

Affinity of the anti-human IL-36R monoclonal antibody binding to human IL-36R

| Sample name | $k_a$ ($10^5$ $M^{-1}S^{-1}$) | $k_d$ ($10^{-5}$ $S^{-1}$) | $K_D$ ($10^{-10}$M) |
|---|---|---|---|
| QX009N | 1.14 | 3.58 | 3.13 |
| Spesolimab | 0.36 | 3.11 | 8.62 |

The data in the table is: the calculated average value after three times of detection of each sample Example 3

Activities of QX009N (HZD25-54) and the Spesolimab analog in neutralizing STAT3 phosphorylation in HT29 reporter gene cells induced by human IL-36 (α, β, γ).

Activity of QX009N (HZD25-54) in antagonizing phosphorylation of intracellular signaling molecule STAT3 induced by human IL-36 (α, β, γ) via IL-36R-IL-1RAcp was determined by using HT29 reporter gene cell line: cells were added into a 96-well cell culture plate with 40,000 cells and 100 μl per well, and then cultured overnight at 37° C. and 5% $CO_2$. The antibody was added into the cells and incubated for 1 hour, wherein the final concentration of the antibody ranged from 0 to 10000 ng/ml. After incubation, 50 μl/well of a mixture of recombinant human IL-36 (containing 2 ng/ml recombinant human IL-36α, 1 ng/ml recombinant human IL-36β, and 40 ng/ml recombinant human IL-36γ) was added, and then the culture was performed at 37° C. and 5% $CO_2$ for 24 hours. The cell culture supernatant was discarded and 120 μl of ONE Glo Luciferase Reagent was added to each well for 10 minutes of reaction. 80 μl was taken from each well and added to a white 96-well plate. The Luminescence fluorescence signal value was measured and the dose-effect curve was drawn to analyze the antagonistic activity of the antibody. The dose-effect curve is shown in FIG. 4.

Figure 4:
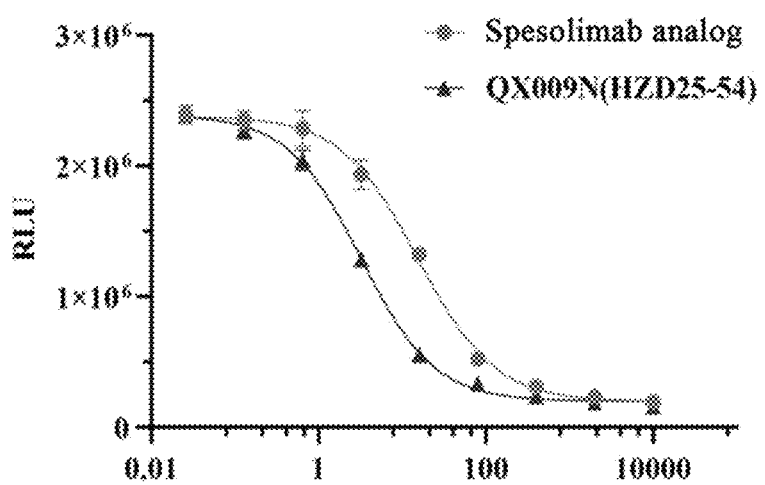
FIG. 4 shows the activities of QX009N (HZD25-54) and the Spesolimab analog in neutralizing STAT3 phosphorylation in HT29 reporter gene cells induced by the human IL-36 (α, β, γ).

The results shown in FIG. 4 indicate that QX009N (HZD25-54) can inhibit STAT3 phosphorylation in HT29 reporter gene cells induced by the human IL-36 (α, β, γ). The IC50 of QX009N (HZD25-54) in inhibiting STAT3 phosphorylation in HT29 reporter cells induced by human IL-36 (α, β, γ) is 2.16 ng/ml. The IC50 of spesolimab analog in inhibiting STAT3 phosphorylation in HT29 reporter cells induced by human IL-36 (α, β, γ) is 15.67 ng/ml.

Example 4

Activities of QX009N (HZD25-54) and the Spesolimab analog in neutralizing CXCL-1 and IL-8 release from HT29 cells induced by the human IL-36 (α, β, γ)

Activity of QX009N (HZD25-54) in antagonizing CXCL-1 and IL-8 release from HT29 cells induced by the human IL-36 (α, β, γ) via IL-36R-IL-1RAcp was determined by using HT29 cell line: cells were added to a 96-well cell culture plate with 40000 cells and 100 μl per well, and then cultured overnight at 37° C. and 5% $CO_2$. The antibody was added into the cells and incubated for 1 hour, wherein the final concentration of the antibody ranged from 0 to 10000 ng/ml. After incubation, 50 μl/well of a mixture of recombinant human IL-36 (containing 1 ng/ml recombinant human IL-36α, 0.2 ng/ml recombinant human IL-36β, and 4 ng/ml recombinant human IL-36γ) was added, and then the culture was performed at 37° C. and 5% $CO_2$ for 24 hours. The cell culture supernatant was collected, the expression of CXCL-1 and IL-8 in the supernatant was detected using Sandwich ELISA, and the dose-effect curve was drawn to analyze the antagonistic activity of the antibody. The dose-effect curve is shown in FIG. 5.

Figure 5:
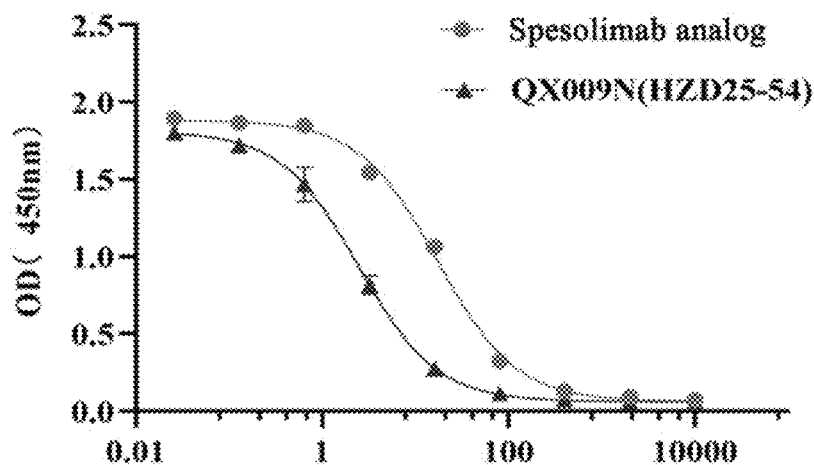
FIG. 5 shows the activities of QX009N (HZD25-54) and the Spesolimab analog in neutralizing CXCL-1 and IL-8 release from HT29 cells induced by the human IL-36 (α, β, γ).
Figure 5:
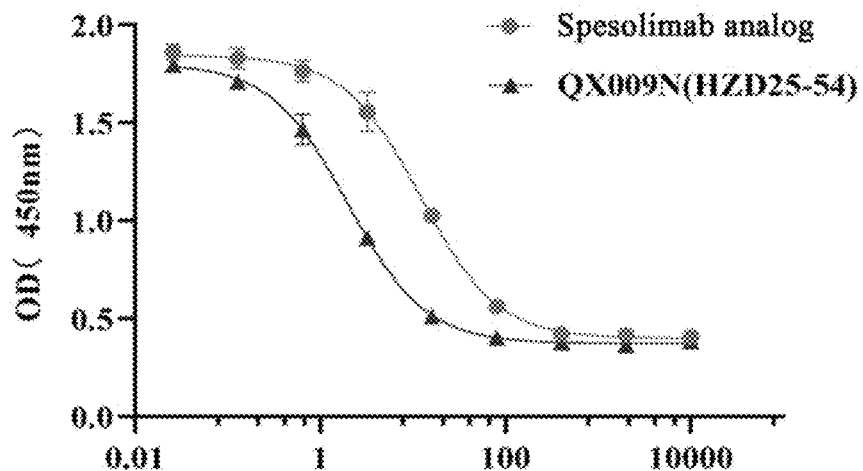

The results shown in FIG. 5 indicate that QX009N (HZD25-54) can inhibit CXCL-1 and IL-8 release from HT29 cells induced by the human IL-36 (α, β, γ). The IC50 of QX009N (HZD25-54) in inhibiting CXCL-1 and IL-8 release from HT29 cells induced by the human IL-36 (α, β, γ) is 2.21 ng/ml and 1.53 ng/ml, respectively. The IC50 of Spesolimab analog in inhibiting CXCL-1 and IL-8 release from HT29 cells induced by the human IL-36 (α, β, γ) is 12.29 ng/ml and 11.47 ng/ml, respectively.

Example 5

Activities of QX009N (HZD25-54) and the Spesolimab analog in neutralizing CXCL-1 and IL-8 release from A431 cells induced by the human IL-36 (α, β, γ)

Activity of QX009N (HZD25-54) in antagonizing CXCL-1 and IL-8 release from HT29 cells induced by the human IL-36 (α, β, γ) via IL-36R-IL-1RAcp was determined by using A431 cell line: cells were added to a 96-well cell culture plate with 40000 cells and 100 μl per well, and then cultured overnight at 37° C. and 5% $CO_2$. The antibody was added into the cells and incubated for 1 hour, wherein the final concentration of the antibody ranged from 0 to 10000 ng/ml. After incubation, 50 μl/well of a mixture of recombinant human IL-36 (containing 20 ng/ml recombinant human IL-36α, 2 ng/ml recombinant human IL-36β, and 50 ng/ml recombinant human IL-36γ) was added, and then the culture was performed at 37° C. and under 5% $CO_2$ for 24 hours. The cell culture supernatant was collected, the expression of CXCL-1 and IL-8 in the supernatant was detected using Sandwich ELISA, and the dose-effect curve was drawn to analyze the antagonistic activity of the antibody. The dose-effect curve is shown in FIG. 6.

Figure 6:
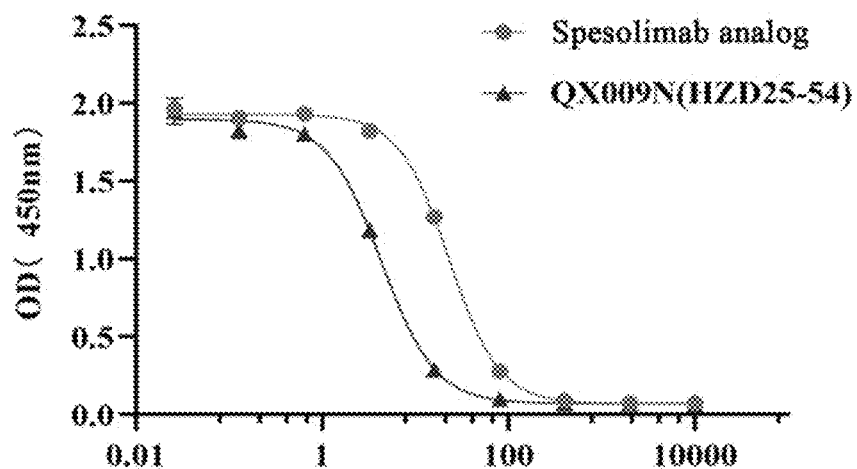
FIG. 6 shows the activity of QX009N (HZD25-54) and the Spesolimab analog in neutralizing CXCL-1 and IL-8 release from A431 cells induced by the human IL-36 (α, β, γ).
Figure 6:
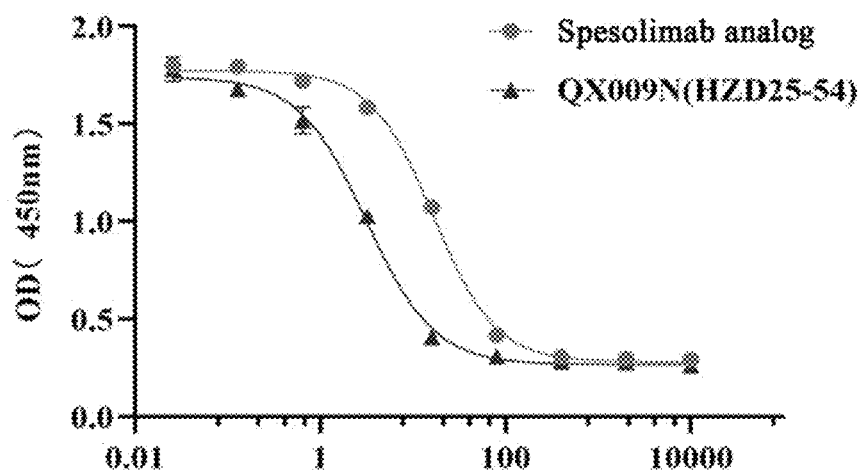

The results shown in FIG. 6 indicate that QX009N (HZD25-54) can inhibit CXCL-1 and IL-8 release from A431 cells induced by the human IL-36 (α, β, γ). The IC50 of QX009N (HZD25-54) in inhibiting CXCL-1 and IL-8 release from A431 cells induced by the human IL-36 (α, β, γ) is 4.12 ng/ml and 2.89 ng/ml, respectively. The IC50 of Spesolimab analog in inhibiting CXCL-1 and IL-8 release from A431 cells induced by the human IL-36 (α, β, γ) is 12.29 ng/ml and 11.47 ng/ml, respectively.

Example 6

Activities of QX009N (HZD25-54) and the Spesolimab analog in neutralizing IL-8 release from PBMC cells induced by the human IL-36β.

Activity of QX009N (HZD25-54) in antagonizing IL-8 release from human PBMC cells via IL-36R-IL-1RAcp induced by the human IL-36β was determined by using human PBMC cells: PBMCs were isolated from human venous blood (derived from adult healthy volunteer) by density gradient centrifugation, and added into a 96-well cell culture plate with 100 μl and 200000 cells per well. The antibody was added to the PBMCs and incubated for 1 hour, wherein the final concentration of the antibody ranged from 0 to 5000 ng/ml. After incubation, 10 ng/ml of recombinant human IL-36β was added at 50 μl/well, and then the culture was performed at 37° C. and 5% $CO_2$ for 24 hours. The cell culture supernatant was collected, the expression of IL-8 in the supernatant was detected using Sandwich ELISA, and the dose-effect curve was drawn to analyze the antagonistic activity of the antibody. The dose-effect curve is shown in FIG. 7.

Figure 7:
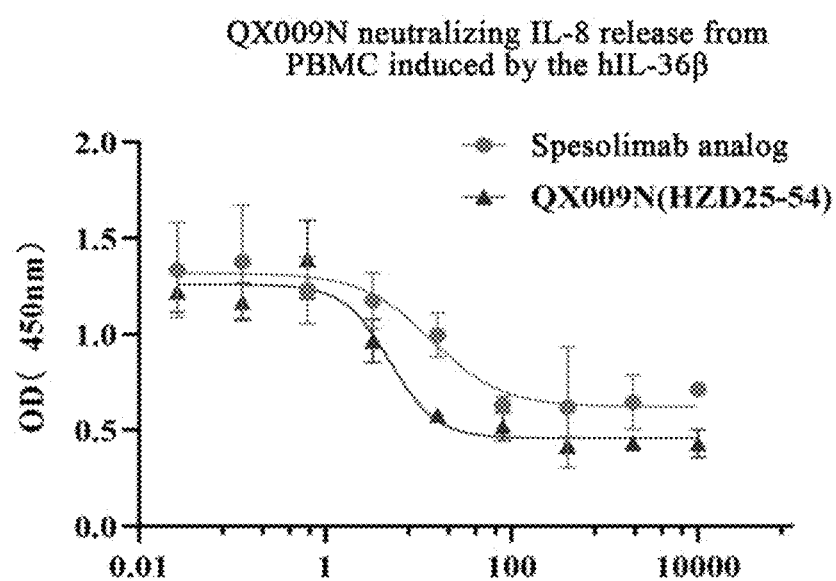
FIG. 7 shows the activity of QX009N (HZD25-54) and the Spesolimab analog in neutralizing IL-8 release from PBMC cells induced by the human IL-36β.

The results shown in FIG. 7 indicate that QX009N (HZD25-54) can inhibit IL-8 release from human PBMC cells induced by the human IL-36β. The IC50 of QX009N (HZD25-54) in inhibiting IL-8 release from human PBMC cells induced by the human IL-36β is 4.69 ng/ml. The IC50 of Spesolimab analog in inhibiting IL-8 release from human PBMC cells induced by the human IL-36β is 26.59 ng/ml.

The invention claimed is:

1. An anti-human interleukin 36 receptor (IL-36R) monoclonal antibody, comprising three heavy chain complementarity determining regions CDR-H1, CDR-H2 and CDR-H3, and three light chain complementarity determining regions CDR-L1, CDR-L2 and CDR-L3, wherein
the amino acid sequence of the CDR-H1 is represented by SEQ ID NO: 1;
the amino acid sequence of the CDR-H2 is represented by SEQ ID NO: 2;
the amino acid sequence of the CDR-H3 is represented by SEQ ID NO: 3;
the amino acid sequence of the CDR-L1 is represented by SEQ ID NO: 4;
the amino acid sequence of the CDR-L2 is represented by SEQ ID NO: 5; and
the amino acid sequence of the CDR-L3 is represented by SEQ ID NO: 6.

2. The monoclonal antibody according to claim 1, wherein it comprises a heavy chain variable region and a light chain variable region, and wherein
the amino acid sequence of the heavy chain variable region is represented by SEQ ID NO: 7; and
the amino acid sequence of the light chain variable region is represented by SEQ ID NO: 8.

3. A pharmaceutical composition, comprising the monoclonal antibody according to claim 1 and a pharmaceutically acceptable carrier.

4. The pharmaceutical composition according to claim 3, wherein the pharmaceutical composition is used for treating a signaling-related disease mediated by IL-36R.

5. The pharmaceutical composition according to claim 4, wherein the signaling-related disease mediated by IL-36R is selected from the group consisting of: dermatitis, psoriasis, inflammatory bowel disease, arthritis, systemic lupus erythematosus, inflammatory lung disease, multiple sclerosis, scleroderma, and chronic kidney disease.

6. The pharmaceutical composition according to claim 5,
wherein the psoriasis is generalized pustular psoriasis, palmoplantar pustulosis, or psoriasis vulgaris,
wherein the dermatitis is atopic dermatitis,
wherein the inflammatory lung disease is chronic obstructive pulmonary disease,
wherein the arthritis is psoriatic arthritis, rheumatoid arthritis, or ankylosing spondylitis, and
wherein the inflammatory lung disease is asthma.

7. A method for treating a signaling-related disease mediated by IL-36R, comprising:
administering the monoclonal antibody according to claim 1 to a subject in need thereof.

8. The method according to claim 7, wherein the signaling-related disease mediated by IL-36R is selected from the group consisting of: dermatitis, psoriasis, inflammatory bowel disease, arthritis, systemic lupus erythematosus, inflammatory lung disease, multiple sclerosis, scleroderma, and chronic kidney disease.

9. The pharmaceutical composition according to claim 8,
wherein the psoriasis is generalized pustular psoriasis, palmoplantar pustulosis, or psoriasis vulgaris,
wherein the dermatitis is atopic dermatitis,
wherein the inflammatory lung disease is chronic obstructive pulmonary disease,
wherein the arthritis is psoriatic arthritis, rheumatoid arthritis, or ankylosing spondylitis, and
wherein the inflammatory lung disease is asthma.

10. A method for treating a signaling-related related disease mediated by IL-36R, comprising:
administering the monoclonal antibody according to claim 2 to a subject in need thereof.

11. The method according to claim 10, wherein the signaling-related disease mediated by IL-36R is selected from the group consisting of dermatitis, psoriasis, inflammatory bowel disease, arthritis, systemic lupus erythematosus, inflammatory lung disease, multiple sclerosis, scleroderma, and chronic kidney disease.

12. The pharmaceutical composition according to claim 11,
wherein the psoriasis is generalized pustular psoriasis, palmoplantar pustulosis, or psoriasis vulgaris,
wherein the dermatitis is atopic dermatitis,
wherein the inflammatory lung disease is chronic obstructive pulmonary disease,
wherein the arthritis is psoriatic arthritis, rheumatoid arthritis, or ankylosing spondylitis, and
wherein the inflammatory lung disease is asthma.

* * * * *